June 5, 1956   E. DORE   2,748,826
SKID PREVENTING DEVICES FOR AUTOMOTIVE VEHICLES
Original Filed April 16, 1952
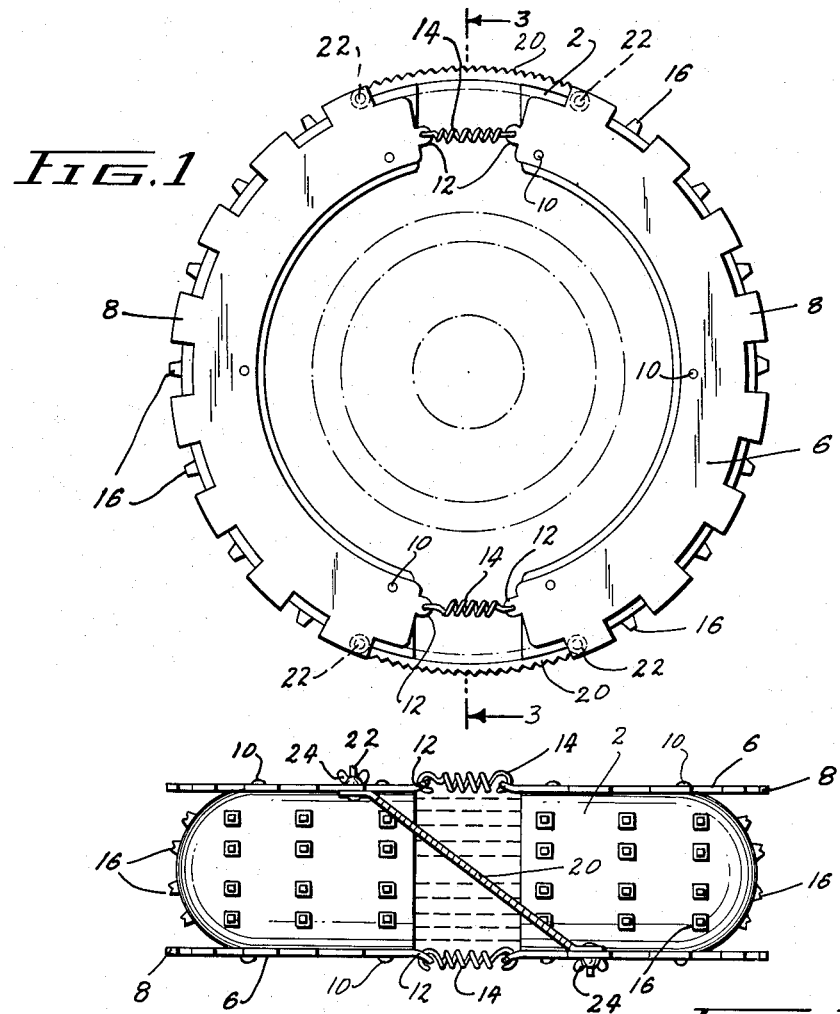
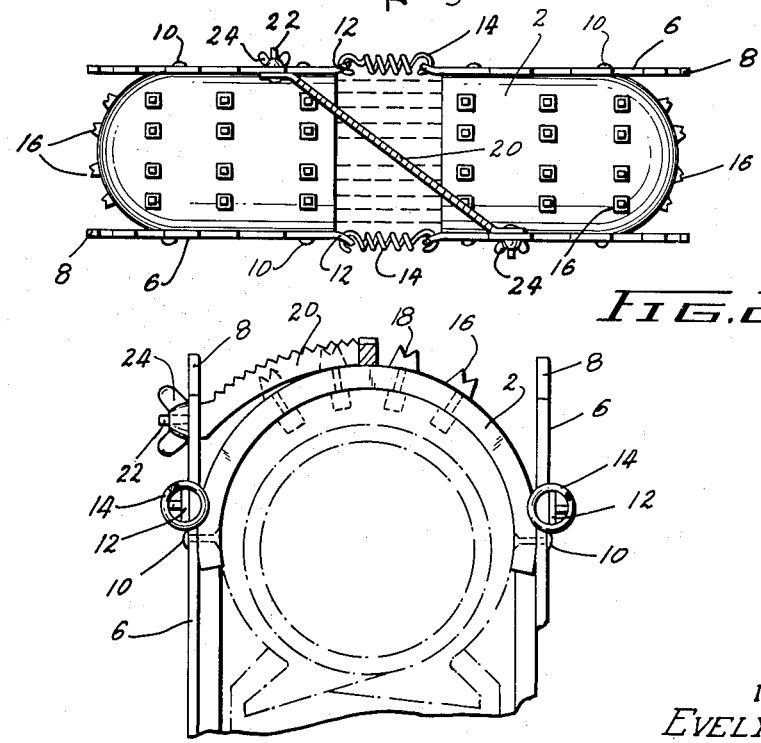
INVENTOR.
EVELYN DORE
BY
ATTORNEY

United States Patent Office 2,748,826
Patented June 5, 1956

2,748,826
SKID PREVENTING DEVICES FOR AUTOMOTIVE VEHICLES

Evelyn Dore, New York, N. Y.

Application July 15, 1955, Serial No. 522,296

2 Claims. (Cl. 152—179)

This invention relates to anti-skid devices for vehicles, and more particularly for rubber tired motor vehicles.

As is well known, one of the greatest dangers to which motorists are subjected is the skidding or side slipping of an automobile on icy streets or highways. If the ice is hard and smooth, the usual tire chains afford but little protection against side slip.

The general object of the invention is to provide an attachment which may be applied to existing motor vehicles, and which will effectively prevent any side slip of the wheels when traveling over icy surfaces.

Another object of the present invention is the provision of a device of the character described which is provided with a snow tosser as well as with an ice cutter, so that snow and ice particles will be tossed laterally away from the vehicle thus preventing accumulation of snow and ice under the fenders to such an extent as to avoid friction thereon of the rotating wheels.

A further object of the present invention is the provision of a device of the character described which is adjustable and resilient to a certain extent, so that a device constructed in accordance with the present invention can be used on tires of different sizes.

Yet still another object of the present invention is the provision of a device of the character described which can be attached to, and removed from, a wheel easily and quickly as well as without any considerable amount of effort or skill, and which is simple in construction as well as comparatively light in weight, but which is also sturdy, durable and well adapted to withstand the rough usage to which devices of this type ordinarily are subjected.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing a preferred form of the invention has been shown.

In said drawing:

Figure 1 is a side view of a preferred embodiment of my invention,

Fig. 2 is a bottom plan view of the same, and,

Fig. 3 is an enlarged fractional sectional view on the line 3—3 of Fig. 1.

Similar reference characters refer to similar parts throughout the several views.

In the drawing the numeral 2 denotes a pair of substantially semi-circular channel members of a rubberized fabric material or of any other suitable flexible and (or) elastic material, which are semi-circular in cross-section and adapted for fitting around the tread surface as well as over the major sections of the side portions of a tire 4 of an automotive vehicle. A pair of substantially semi-circular plates 6, whose outer edge portions are provided with serrations 8, are secured to the lateral portions of each member 2 by means of rivets 10 or the like.

Although the parts 2 and 6 can be fastened to the wheel by any suitable means I prefer to secure them thereto in the manner shown in the drawing, where it will be seen that the ends of the plates 6 are provided with lug portions 12 into which are hooked the hook-shaped ends of tension springs 14. This arrangement permits to attach the parts 2 and 6 to a tire 4 easily and quickly by placing the parts 2 around one tire 4, expanding the springs 14, hooking their ends into the lugs 12 and releasing the springs 14. Similarly simple is the detaching of the parts 2 and 6 from the tire 4. Since the parts 2 are flexible and somewhat resilient they can be used on tires which vary as to size to a certain degree.

I prefer to provide the parts 2 with a plurality of protruding elements, such as nails 16, whose heads are preferably provided with slots 18 (Fig. 3) and reduced toward the top. These protruding elements also may be protruding rubber elements or the like. Furthermore, I prefer to extend diagonally across those portions of the tire 4 which are not covered by the members 2 toothed bars 20, which are detachably secured to diagonally opposite portions of the plates 6 by means of screws 22 and wing nuts 24 or the like.

In operation, the serrated plates 6 will cut into the ice, the nails 16 will prevent skidding, and the bars 20 will toss some of the snow and ice particles laterally away from the vehicle.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A skid preventing device for automotive vehicles comprising a pair of resilient, substantially semi-circular members adapted for encompassing sections of the outer portion of a tire, resilient means engaging the ends of said members tending to force said members toward each other, a plurality of protruding elements provided at the outer side of each of said members, semi-circular plates having serrated edge portions being secured laterally to said members, and toothed bars diagonally extending over the end portions of said members having their ends detachably secured to diagonally opposite end portions of said semi-circular plates.

2. A device of the character described comprising a pair of elastic, semi-circular members being substantially semi-circular in cross-section and adapted for encompassing sections of the tread surface as well as lateral portions of a tire, a pair of semi-circular plates having serrated edge portions being secured laterally to each of said members, tension springs detachably secured to the ends of said semi-circular plates tending to pull the same toward each other and to press said members firmly around the tire, a plurality of taper members in spaced relation to each other being secured to and extended beyond the outer side of said semi-circular members, and toothed bars diagonally extending over the end portions of said members having their ends detachably secured to diagonally opposite end portions of said semi-circular plates.

References Cited in the file of this patent

UNITED STATES PATENTS

| | | |
|---|---|---|
| 740,184 | Sainsbury | Sept. 29, 1903 |
| 1,595,339 | Brittain | Aug. 10, 1926 |
| 2,494,850 | Williams | Jan. 17, 1950 |
| 2,684,100 | Helmers | July 20, 1954 |

FOREIGN PATENTS

| | | |
|---|---|---|
| 26,343 | Great Britain | 1905 |